(12) United States Patent
Pandya et al.

(10) Patent No.: US 10,754,795 B2
(45) Date of Patent: Aug. 25, 2020

(54) MMU ASSISTED ADDRESS SANITIZER

(71) Applicant: QUALCOMM Incorporated, San Diego, CA (US)

(72) Inventors: Chintan Bipinchandra Pandya, Hyderabad (IN); Ramswaroop Ghanshyam Somani, Ichalkaranji (IN)

(73) Assignee: Qualcomm Incorporated, San Diego, CA (US)

( * ) Notice: Subject to any disclaimer, the term of this patent is extended or adjusted under 35 U.S.C. 154(b) by 87 days.

(21) Appl. No.: 16/199,549

(22) Filed: Nov. 26, 2018

(65) Prior Publication Data

US 2020/0167293 A1 May 28, 2020

(51) Int. Cl.
```
G06F 12/14       (2006.01)
G06F 12/1009     (2016.01)
G06F 12/02       (2006.01)
G06F 9/30        (2018.01)
G06F 9/38        (2018.01)
```

(52) U.S. Cl.
CPC ........ *G06F 12/145* (2013.01); *G06F 9/30116* (2013.01); *G06F 9/3861* (2013.01); *G06F 12/0246* (2013.01); *G06F 12/1009* (2013.01); *G06F 2212/1052* (2013.01); *G06F 2212/657* (2013.01); *G06F 2212/7201* (2013.01); *G06F 2212/7209* (2013.01)

(58) Field of Classification Search
CPC .. G06F 9/30116; G06F 9/3861; G06F 12/145; G06F 12/0246; G06F 12/1009; G06F 2212/1052; G06F 2212/657; G06F 2212/7201; G06F 2212/7209
See application file for complete search history.

(56) References Cited

U.S. PATENT DOCUMENTS 9,588,902 B2 * 3/2017 Terry .................. G06F 12/1009
10,007,443 B1 * 6/2018 Rajadnya ............. G06F 3/0613
(Continued)

OTHER PUBLICATIONS

Author Unknown, "AddressSanitizerAtgorithm," google/sanitizers wiki, last edited Oct. 3, 2017, 4 pages, https://github.com/google/sanitizers/wiki/AddressSanitizerAlgorithm.
(Continued)

*Primary Examiner* — Ryan Bertram
(74) *Attorney, Agent, or Firm* — Withrow & Terranova (57) ABSTRACT

Providing memory management unit (MMU)-assisted address sanitizing in processor-based devices is disclosed. In one aspect, a processor-based device provides an MMU that includes a last-level page table that is configured to store page table entry (PTE) tokens for validating memory accesses, as well as fragment order indicators representing a count of page fragments for each memory page in the system memory. Upon receiving a memory access request comprising a pointer token and a virtual address of a memory fragment within a memory page of the system memory, the MMU uses the virtual address and the fragment order indicator of the PTE corresponding to the virtual address to retrieve a PTE token for the virtual address from the last-level page table, and determines whether the PTE token corresponds to the pointer token. If so, the MMU performs the memory access request using the pointer, and otherwise may raise an exception.

22 Claims, 9 Drawing Sheets

(56) References Cited

U.S. PATENT DOCUMENTS

| | | | | |
|---|---|---|---|---|
| 2006/0230223 A1* | 10/2006 | Kruger | ................ | G06F 12/1009 |
| | | | | 711/6 |
| 2016/0231933 A1* | 8/2016 | Loh | ....................... | G06F 3/0604 |
| 2017/0285968 A1* | 10/2017 | Jung | ....................... | G06F 3/061 |
| 2018/0011792 A1* | 1/2018 | Koker | ................. | G06F 12/1063 |
| 2018/0039580 A1* | 2/2018 | Schneider | ............. | G06F 9/4403 |
| 2019/0065380 A1* | 2/2019 | Guthrie | ............... | G06F 12/1027 |

OTHER PUBLICATIONS

Serebryany, Kostya et al., "Memory Tagging and how it improves C/C++ memory safety," Google, Feb. 2018, 14 pages, https://anxiv.org/ftp/arxiv/papers/1802/1802.09517.pdf.

* cited by examiner

MMU ASSISTED ADDRESS SANITIZER

BACKGROUND

I. Field of the Disclosure

The technology of the disclosure relates generally to processor-based devices, and, in particular, to debugging memory issues and improving security in processor-based devices.

II. Background

Developing software for processor-based devices using languages such as C or C++ frequently requires debugging of difficult-to-isolate issues, such as use-after-free issues (i.e., attempting to access a memory location after the memory location has been freed) and heap overflows. These issues may also open possibilities for security vulnerabilities that may be exploited by malicious users. Such issues may be even more difficult to identify and locate when developing complex multi-threaded software such as Linux operating system kernels. To facilitate identification of such issues, one conventional approach, referred to generally as Address Sanitizer (ASAN), reserves a portion of a system memory as "shadow memory," in which a state (e.g., "allocated" or "free") of each addressable location of the system memory is maintained. Additionally, compiler-instrumented debugging code is injected into software under development to access the shadow memory and retrieve the state for every memory read operation and memory write operation performed on the memory used by the software. In this manner, any illegal access to system memory that normally would result in a use-after-free issue or a heap overflow may be detected and handled appropriately. Another approach known as hardware-assisted ASAN (HWASAN) also makes use of shadow memory, but instead of storing a memory state, the shadow memory is used to store an "ownership token" that is generated and stored in the top byte of each memory pointer. The use of the ownership token allows HWASAN to identify use-after-free issues that arise on reallocated memory locations.

Figure 1:
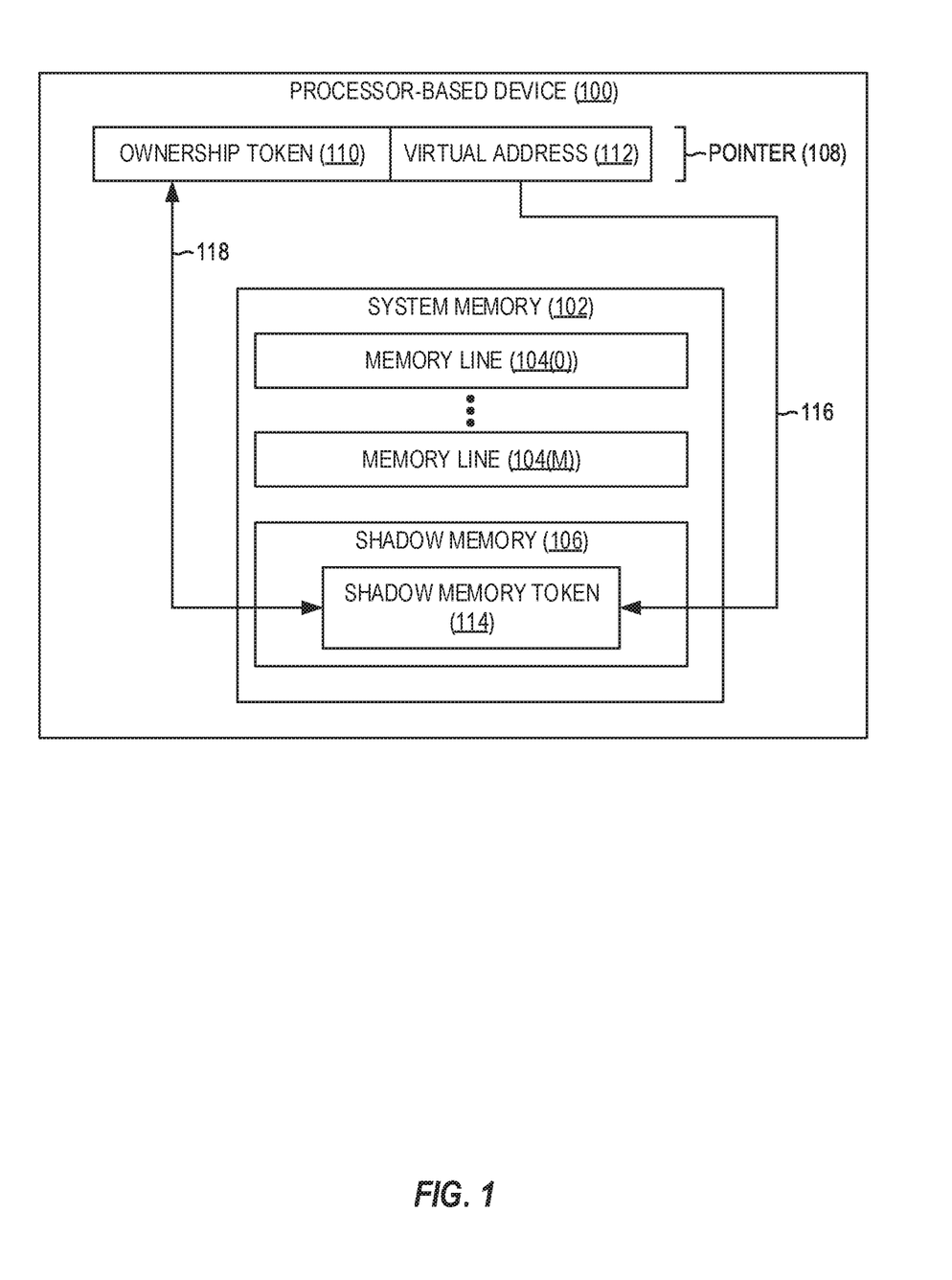
FIG. 1 is a block diagram illustrating a conventional processor-based device configured to employ shadow memory within a system memory to store ownership tokens for use in address sanitizing.

FIG. 1 illustrates a processor-based device 100 configured to use HWASAN to provide address sanitizing. The processor-based device 100 includes a system memory 102 made up of a plurality of conventional memory lines 104(0)-104(M). A portion of the system memory 102 is also reserved as a shadow memory 106, Upon allocation of a pointer 108, an ownership token 110 is generated for a virtual address 112 of the pointer 108 and stored in the shadow memory 106 as a shadow memory token 114 at a location that is determined based on the virtual address 112 (e.g., by using an offset value indicated by or derived from the virtual address 112). On each subsequent memory access operation using the pointer 108, the virtual address 112 is used to access the shadow memory 106 to retrieve the shadow memory token 114, as indicated by arrow 116. The shadow memory token 114 is then compared to the ownership token 110 of the pointer 108, as indicated by arrow 118. If the shadow memory token 114 and the ownership token 110 match, the memory access operation is allowed to proceed. However, if the shadow memory token 114 and the ownership token 110 do not match, an exception is raised.

However, the address sanitizing approaches exemplified by ASAN and HWASAN suffer from a number of limitations. Because both approaches use compiler-instrumented debugging code added to the software under development, the size of the software code may be as much as 1.5 to 3 times larger, and the software may execute as much as 1.5 to 3 times slower, than the same software without the debugging code. Moreover, shadow memory may consume 12% or more of system memory. Because of this overhead, ASAN and HWASAN generally are not used in production environments, which limits test coverage. Accordingly, it is desirable to provide debugging functionality that provides the same capabilities as ASAN without incurring the same performance and memory overhead.

SUMMARY OF THE DISCLOSURE

Aspects disclosed in the detailed description include providing memory management unit (MMU)-assisted address sanitizing in processor-based devices. As used herein, "address sanitizing" refers to processes for ensuring the validity of memory access operations to memory locations indicated by virtual addresses to avoid the occurrence of memory issues such as use-after-free issues and heap overflows, as non-limiting examples. In this regard, in one aspect, a processor-based device provides an MMU that includes a last-level page table, and that is communicatively coupled to a system memory. Instead of the processor-based device reserving a portion of the system memory for use as shadow memory, the last-level page table of the MMU is configured to store page table entry (PTE) tokens (e.g., corresponding to the ownership tokens of HWASAN, as a non-limiting example) within PTEs of the last-level page table. In some aspects, the PTE tokens are stored within otherwise unused upper bits of each PTE of the last-level page table, while some aspects may provide that the last-level page table provides shadow PTE entries that are dedicated to storing PTE tokens. Each PTE of the last-level page table also stores a fragment order indicator, which may be used to determine how many page fragments constitute the memory page within the system memory that is indicated by the PTE. The MMU subsequently receives a memory access request comprising a pointer token (such as an ownership token similar to that used in HWASAN, as a non-limiting example) and a virtual address of a memory fragment within a memory page of the system memory. The MMU, as part of the virtual-to-physical address translation process, uses the virtual address and the fragment order indicator of the PTE corresponding to the virtual address to retrieve a PTE token for the virtual address. The MMU determines whether the PTE token corresponds to the pointer token (e.g., by determining whether the PTE token matches the pointer token) and, if so, performs the memory access request using the pointer. in some aspects, if the PTE token does not correspond to the pointer token, the MMU may raise an exception. In this manner, address sanitizing may be performed by the MMU without incurring the performance and memory overhead associated with the ASAN and HWASAN approaches, and may be incorporated into production environments to increase software reliability.

In another aspect, a processor-based device is provided. The processor-based device comprises a system memory comprising a plurality of memory pages. The processor-based device further comprises an MMU that is communicatively coupled to the system memory, and that comprises a last-level page table. The last-level page table includes a plurality of PTEs, each PTE corresponding to a memory page of the plurality of memory pages of the system memory, and each indicating a mapping of a virtual address to a physical address of the memory page corresponding to the PTE. The last-level page table is configured to store a plurality of PTE tokens, each corresponding to a page fragment of one or more page fragments of each memory page of the plurality of memory pages of the system memory. The last-level page table is further configured to store a plurality of fragment order indicators, each corresponding to a memory page of the plurality of memory pages of the system memory and indicating a page fragment count of the memory page. The MMU is configured to receive a memory access request comprising a pointer, wherein the pointer comprises a pointer token and a virtual address. The MMU is further configured to retrieve, based on the virtual address and a fragment order indicator of the plurality of fragment order indicators, a PTE token of the plurality of PTE tokens of the last-level page table corresponding to a page fragment indicated by the virtual address. The MMU is also configured to determine whether the pointer token corresponds to the PTE token. The MMU is additionally configured to, responsive to determining that the pointer token corresponds to the PTE token, perform the memory access request using the pointer.

In another aspect, a processor-based device is provided. The processor-based device comprises a means for receiving a memory access request comprising a pointer, wherein the pointer comprises a pointer token and a virtual address. The processor-based device further comprises a means for retrieving, based on the virtual address and a fragment order indicator of a plurality of fragment order indicators, a PTE token, corresponding to a page fragment indicated by the virtual address, of a plurality of PTE tokens of a last-level page table, wherein the last-level page table comprises a plurality of PTEs, each PTE corresponding to a memory page of a plurality of memory pages of a system memory and indicating a mapping of a virtual address to a physical address of the memory page corresponding to the PTE. The processor-based device also comprises a means for determining whether the pointer token corresponds to the PTE token. The processor-based device additionally comprises a means for performing the memory access request using the pointer, responsive to determining that the pointer token corresponds to the PTE token.

In another aspect, a method for providing MMU-assisted address sanitizing is provided. The method comprises receiving, by an MMU communicatively coupled to a system memory of a processor-based device, a memory access request comprising a pointer, wherein the pointer comprises a pointer token and a virtual address. The method further comprises retrieving, based on the virtual address and a fragment order indicator of a plurality of fragment order indicators, a PTE token, corresponding to a page fragment indicated by the virtual address, of a plurality of PTE tokens of a last-level page table of the MMU, wherein the last-level page table comprises a plurality of PTEs, each PTE corresponding to a memory page of a plurality of memory pages of the system memory and indicating a mapping of a virtual address to a physical address of the memory page corresponding to the PTE. The method also comprises determining whether the pointer token corresponds to the PTE token. The method additionally comprises, responsive to determining that the pointer token corresponds to the PTE token, performing the memory access request using the pointer.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 2:
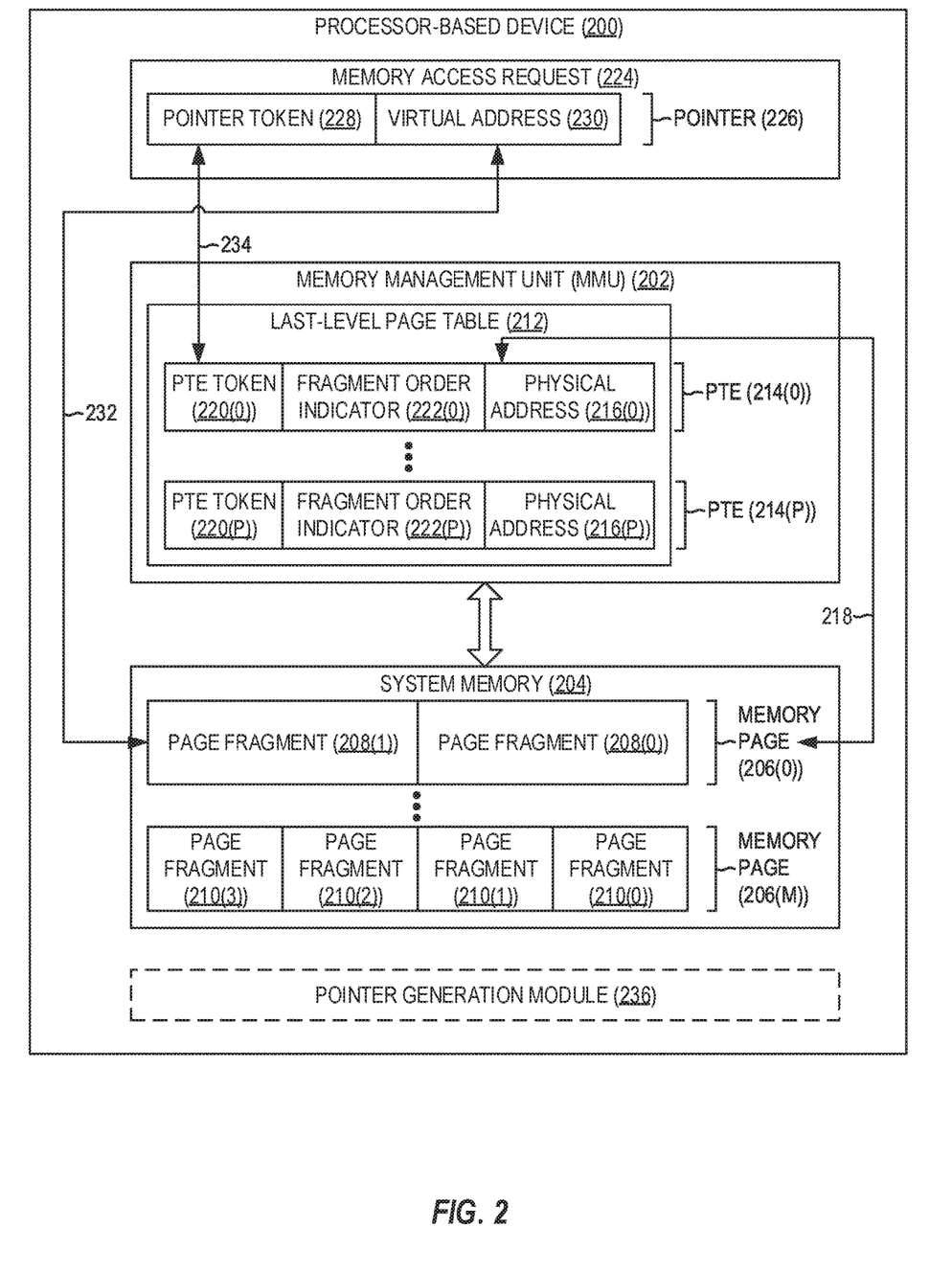
FIG. 2 is a block diagram illustrating an exemplary processor-based device configured to provide memory management unit (MMU)-assisted address sanitizing using tokens stored within existing page table entries (PTEs) of a last-level page table, according to some aspects.

Aspects disclosed in the detailed description include providing memory management unit (MMU)-assisted address sanitizing in processor-based devices. In this regard, FIG. 2 illustrates an exemplary processor-based device 200 including an MMU 202 that is communicatively coupled to a system memory 204 (e.g., double data rate (DDR) synchronous dynamic random access memory (SDRAM) (DDR SDRAM)) comprising a plurality of memory pages 206(0)-206(M). It is to be understood that the processor-based device 200 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

Each of the memory pages 206(0)-206(M) of the system memory 204 is made up of one or more page fragments, such as page fragments 208(0)-208(1) of the memory page 206(0) and page fragments 210(0)-210(3) of the memory page 206(M). In some aspects, the number of page fragments 208(0)-208(1), 210(0)-210(3) in each of the memory pages 206(0)-206(M) is a power of two (2), with the exponent thereof referred to herein as a "fragment order" of each memory page 206(0)-206(M). The MMU 202 includes a last-level page table 212, which in some aspects may be the last in a hierarchical series of page tables (not shown). The last-level page table 212 comprises a plurality of page table entries (PTEs) 214(0)-214(P), each of which includes a physical address 216(0)-216(P) indicating a memory page of the plurality of memory pages 206(0)-206(M) of the system memory 204. Thus, for example, the physical address 216(0) of the PTE 214(0) may correspond to the memory page 206(0) of the system memory 204, as shown by arrow 218.

In a conventional processor-based device, debugging memory issues using address sanitizing according to the ASAN or HWASAN approaches may require that a portion of the system memory 204 be reserved as shadow memory. ASAN and HWASAN may further require that compiler-instrumented code be inserted into software under development to perform validation and raise exceptions, if necessary, for every memory access operation performed. As a result, the software under development will have a larger code size and will execute more slowly, and a signification portion of the system memory 204 will be consumed by the shadow memory. It is thus desirable to provide a mechanism for debugging memory issues that provides the same capabilities as ASAN and HWASAN, without incurring the same performance and memory consumption penalties.

In this regard, the last-level page table 212 of the MMU 202 of FIG. 2 is configured to store, in each PTE 214(0)-214(P), a PTE token 220(0)-220(P) and a fragment order indicator 222(0)-222(P) for use in MMU-assisted address sanitizing. In some aspects, the PTE tokens 220(0)-220(P) are stored within an upper byte of the corresponding PTEs 214(0)-214(P). Each of the PTE tokens 220(0)-220(P) contains one or more ownership tokens generated during allocation of memory pointers, and may comprise all or part of one or more ownership tokens and/or may be derived based on one or more ownership tokens. The fragment order indicators 222(0)-222(P) indicate the fragment order of the memory pages 206(0)-206(M) corresponding to the PTEs 214(0)-214(P), and thus can be used to determine the number of page fragments 208(0)-208(1), 210(0)-210(3) within each of the memory pages 206(0)-206(M). For example, the memory page 206(0) contains two (2) page fragments 208(0)-208(1) (i.e., $2^1$ page fragments), and so the value of the fragment order indicator 222(0) is one (1). Similarly, the memory page 206(M) contains four (4) page fragments 210(0)-210(3) (i.e., $2^2$ page fragments), and so the value of the fragment order indicator 222(P) is two (2).

in exemplary operation, the MMU 202 receives a memory access request 224 (e.g., a memory read access request or a memory write access request) that includes a pointer 226 comprising a pointer token 228 and a virtual address 230. The pointer token 228 is generated upon creation of the pointer 226 using techniques known in the art, such as those used to generate the ownership tokens used by HWASAN. The virtual address 230 is an address that maps to one of the page fragments 208(0)-208(1), 210(0)-210(3) of the memory pages 206(0)-206(M) of the system memory 204. In the example of FIG. 2, the virtual address 230 maps to the page fragment 208(1) of the memory page 206(0), as indicated by arrow 232.

The MMU 202, as part of its virtual-to-physical address translation processing, identifies the PTE 214(0) as storing the physical address 216(0) corresponding to the memory page 206(0) containing the page fragment 208(1) addressed by the virtual address 230 of the pointer 226. The MMU then retrieves the PTE token 220(0) and the fragment order indicator 222(0) of the PTE 214(0). It is to be understood that, in some aspects, each of the PTE tokens 220(0)-220(P) represents ownership tokens for all of the page fragments 208(0)-208(1), 210(0)-210(3) in the corresponding memory pages 206(0)-206(M). Thus, for example, if each of the PTE tokens 220(0)-220(P) is eight (8) bits in length, the lower four (4) bits of the PTE token 220(0) may represent the ownership token for the page fragment 208(0), while the upper four (4) bits of the PTE token 220(0) may represent the ownership token for the page fragment 208(1). Likewise, the page fragments 210(0)-210(3) are each associated with ownership tokens having a size of two (2) bits within the PTE token 220(P).

In such aspects in which each of the PTE tokens 220(0)-220(P) may represent ownership tokens for more than one page fragment 208(0)-208(1), 210(0)-210(3), the MMU 202 provides a mechanism to determine which portions of the PTE tokens 220(0)-220(P) correspond to each of the page fragments 208(0)-208(1), 210(0)-210(3). In some aspects, the MMU 202 uses a subset of bits of the virtual address 230, along with the fragment order indicators 222(0)-222(P), as a selection mechanism. For instance, assume that each memory page 206(0)-206(M) has a size of four (4) kilobytes (4K), and further that bits 0-11 of the virtual address 230 provide an address within a 4K range. In the example of FIG. 2, the MMU 202 retrieves the fragment order indicator 222(0), which has a value of one (1) indicating that the memory page 206(0) contains two (2) page fragments 208(0)-208(1). The MMU 202 thus may use the value of the one (1) highest bit of bits 0-11 (i.e., bit 11) of the virtual address 230 to identify the page fragment 208(1) as corresponding to the virtual address 230, and to also identify the upper half of the bits of the PTE token 220(0) as containing the ownership token corresponding to the page fragment 208(1). Similarly, to access the appropriate portion of the PTE token 220(P) corresponding to the page fragments 210(0)-210(3) of the memory page 206(M), the MMU 202 would retrieve the fragment order indicator 222(P), which has a value of two (2) indicating that the memory page 206(M) contains four (4) page fragments 210(0)-210(3), The MMU 202 therefore would use the value of the two (2) highest bits of bits 0-11 (i.e., bits 11 and 10) of the virtual address 230 to identify the desired page fragment 210(0)-210(3) and the corresponding portion of the PTE token 220(P).

After retrieving the PTE token 220(0), the MMU 202 then determines whether the PTE token 220(0) corresponds to the pointer token 228 of the pointer 226, as indicated by arrow 234. In some aspects, the MMU 202 may determine whether the PTE token 220(0) corresponds to the pointer token 228 by determining whether the PTE token 220(0) has a value equal to the value of the pointer token 228, by determining whether a subportion of the PTE token 220(0) has a value equal to the corresponding subportion of the pointer token 228, or by determining whether the PTE token 220(0) or a subportion thereof can be programmatically or mathematically derived from the pointer token 228, as non-limiting examples. If the MMU 202 determines that the PTE token 220(0) does correspond to the pointer token 8 of the pointer 226, the pointer 226 is considered valid, and the MMU 202 proceeds with performing the memory access request 224 using the pointer 226. In some aspects, if the MMU 202 determines that the PTE token 220(0) does not correspond to the pointer token 228 of the pointer 226, the MMU 202 raises an exception.

Some aspects of the MMU 202 further provide a pointer generation module 236 to generate the pointer 226, and to update the appropriate PTE token 220(0)-220(P) based on the pointer token 228 of the pointer 226. In such aspects, the pointer generation module 236 generates the pointer 226 comprising the pointer token 228 and the virtual address 230. The pointer generation module 236 further generates the PTE token 220(0) responsive to generating the pointer 226. Generating the PTE token 220(0) may comprise, as a non-limiting example, retrieving a current value of the PTE token 220(0) and updating an appropriate subportion of the PTE token 220(0) to correspond to the pointer token 228.

The pointer generation module 236 may then store the PTE token 220(0) in the last-level page table 212.

Figure 3:
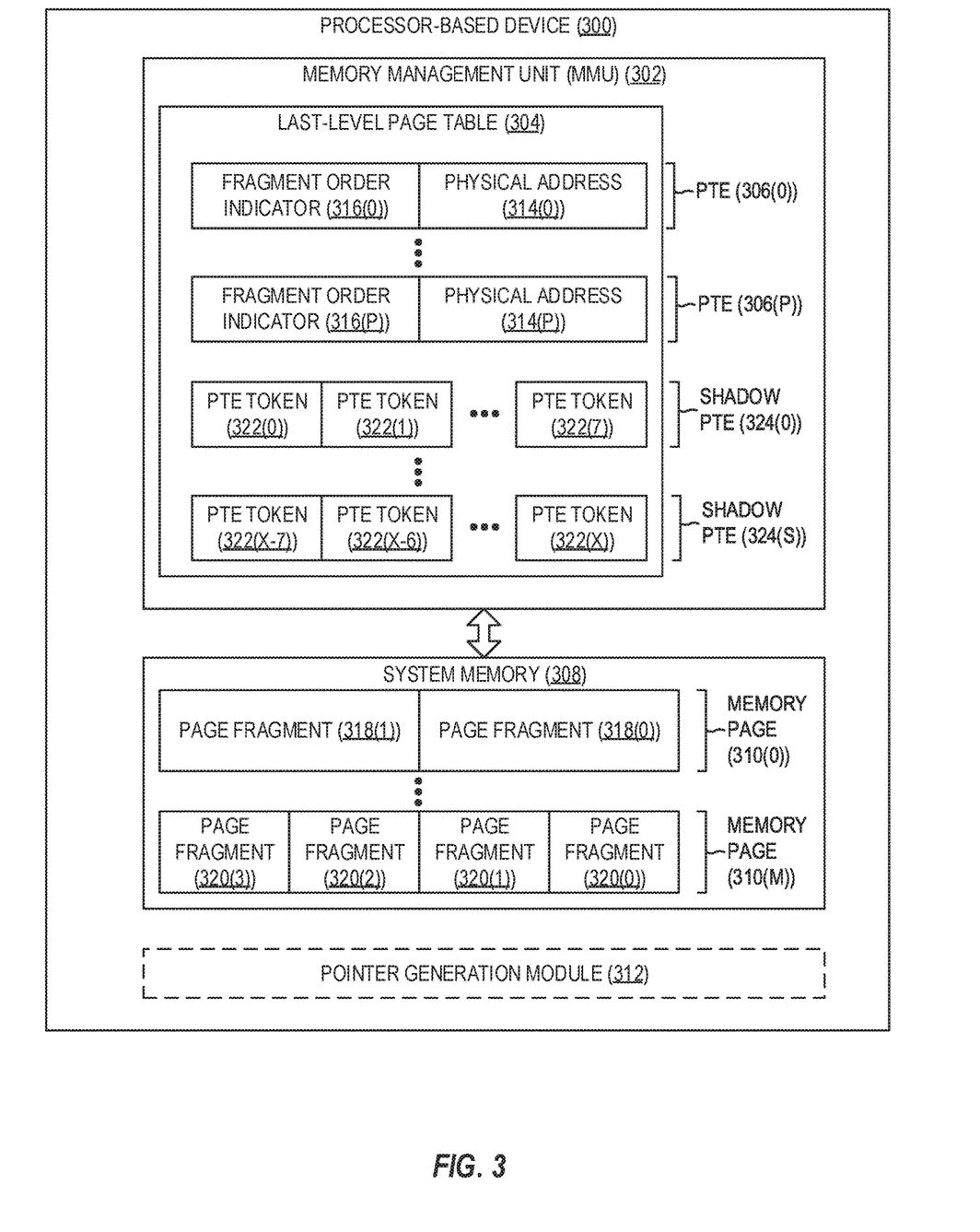
FIG. 3 is a block diagram illustrating an exemplary processor-based device configured to provide memory management unit (MMU)-assisted address sanitizing using tokens stored within dedicated shadow PTEs of a last-level page table, according to some aspects.

FIG. 3 illustrates another aspect in which PTE tokens are stored in separate shadow PTEs within a last-level page table, instead of being stored within conventional PTEs of the last-level page table. In this regard, FIG. 3 shows a processor-based device 300 that includes an MMU 302, a last-level page table 304 comprising a plurality of PTEs 306(0)-306(P), a system memory 308 comprising a plurality of memory pages 310(0)-310(M), and, in some aspects, a pointer generation module 312, with each element having functionality corresponding to the MMU 202, the last-level page table 212, the plurality of PTEs 214(0)-214(P), the system memory 204, the plurality of memory pages 206(0)-206(M), and the pointer generation module 236, respectively, of FIG. 2. The PTEs 306(0)-306(P) of FIG. 3 each provide a physical address 314(0)-314(P) and a fragment order indicator 316(0)-316(P), and the memory pages 310(0)-310(M) are subdivided into page fragments 318(0)-318(1), 320(0)-320(3). However, unlike the last-level page table 212 of FIG. 2, the last-level page table 304 of FIG. 3 stores PTE tokens 322(0)-322(X) in a plurality of shadow PTEs 324(0)-324(S) at locations determined based on corresponding virtual addresses, such as the virtual address 230 of FIG. 2 (e.g., by using offset values indicated by or derived from the virtual addresses, as non-limiting examples). By storing the PTE tokens 322(0)-322(X) in the shadow PTEs 324(0)-324(S), this configuration may provide better granularity with respect to page fragment size. As a non-limiting example, each of the shadow PTEs 324(0)-324(S) in some aspects may correspond to a single one of the memory pages 310(0)-310(M) and may comprise 64 bits representing one or more of the PTE tokens 322(0)-322(X) for page fragments such as the page fragments 318(0)-318(1), 320(0)-320(3). Accordingly, in such aspects, each of the shadow PTEs 324(0)-324(S) may represent PTE tokens 322(0)-322(X) for up to 64 page fragments.

Figure 4A:
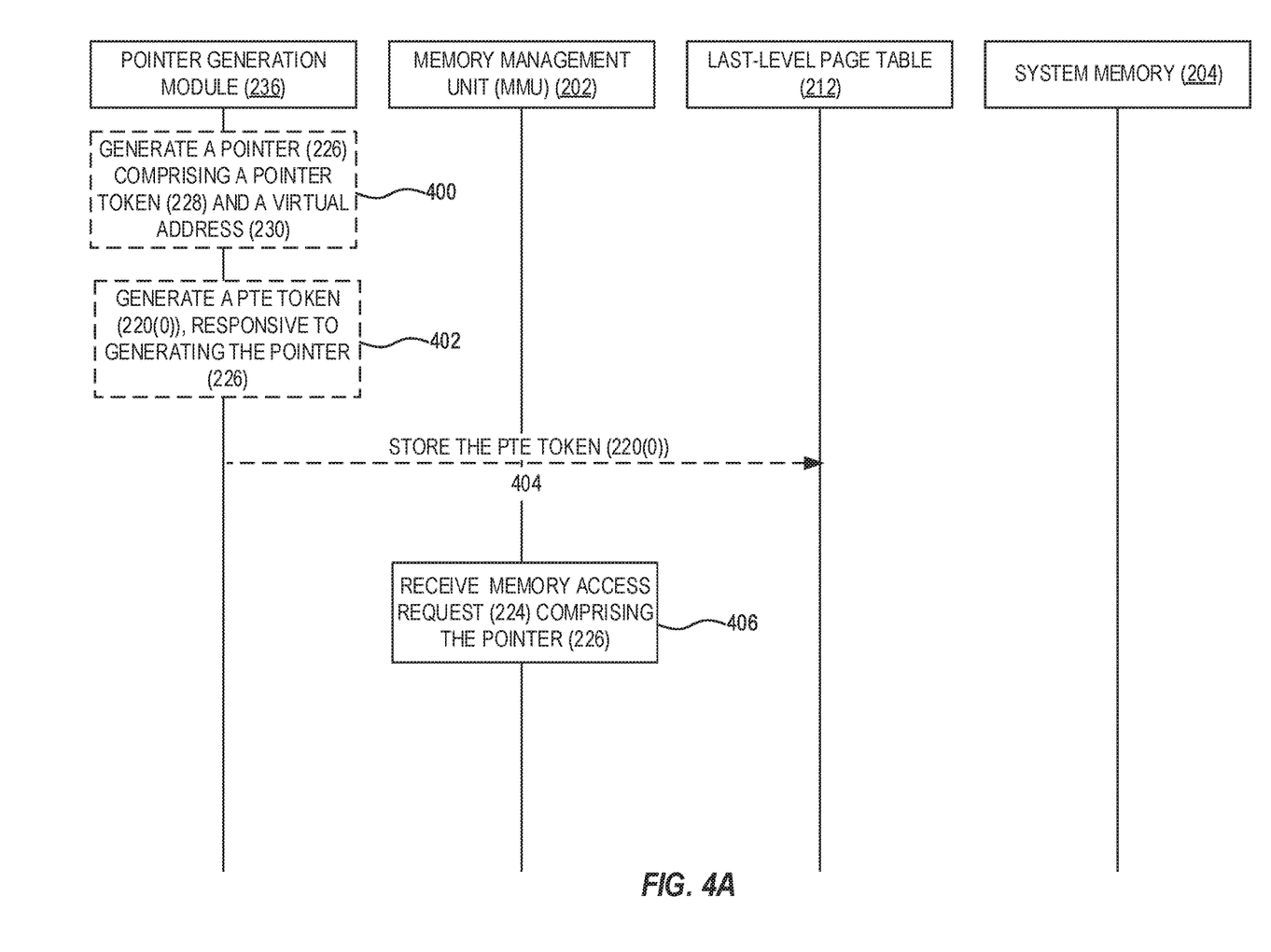
FIGS. 4A and 4B are messaging diagrams illustrating exemplary communications flows among elements of the processor-based device according to some aspects for providing MMU-assisted address sanitizing.
Figure 4B:
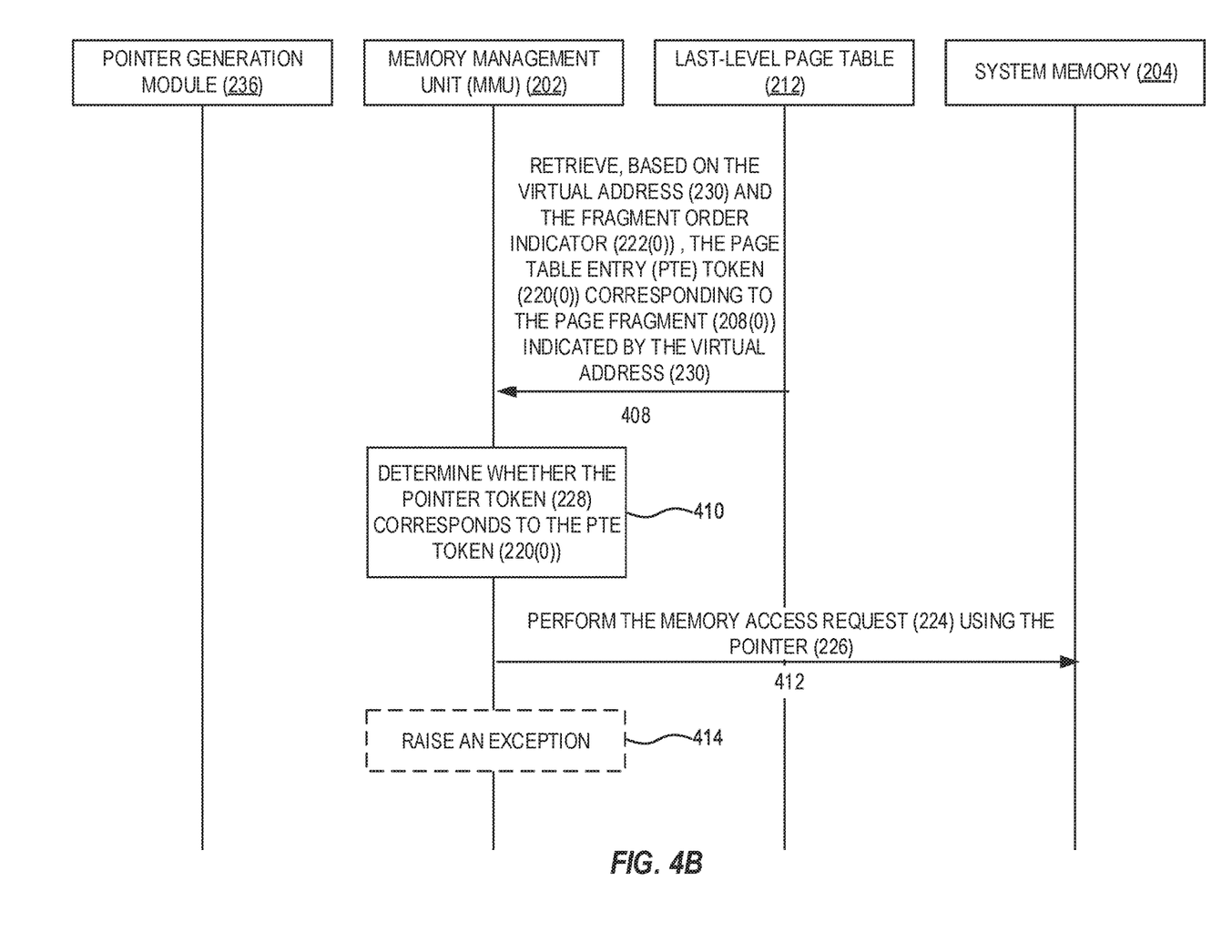

To illustrate exemplary communications flows among elements of the processor-based device 200 of FIG. 2 for providing MMU-assisted address sanitizing, FIGS. 4A and 4B are provided. For the sake of clarity, elements of FIG. 2 are referenced in describing FIG. 4, although it is to be understood that the communications flows illustrated in FIG. 4 may also apply to corresponding elements of FIG. 3. As seen in FIGS. 4A and 4B, the pointer generation module 236, the MMU 202, the last-level page table 212, and the system memory 204 each are represented by a box at the top of the figure. Communications flows in some aspects begin with the pointer generation module 236 generating the pointer 226 comprising the pointer token 228 and the virtual address 230, as shown in block 400. The pointer generation module 236 also may generate the PTE token 220(0) responsive to generating the pointer 226, as shown in block 402. The pointer generation module 236 then stores the PTE token 220(0) in the last-level page table 212, as indicated by arrow 404. The MMU 202 subsequently receives the memory access request 224 comprising the pointer 226, as shown in block 406. Processing then resumes with arrow 408 in FIG. 4B.

Referring now to FIG. 4B, the MMU 202 next retrieves, based on the virtual address 230 and the fragment order indicator 222(0), the PTE token 220(0) corresponding to the page fragment 208(1) indicated by the virtual address 230, as indicated by arrow 408. The MMU 202 determines whether the pointer token 228 corresponds to the PTE token 220(0), as shown in block 410. If so, the MMU 202 performs the memory access request 224 using the pointer 226, as indicated by arrow 412. However, in some aspects, if the MMU 202 determines that the pointer token 228 does not correspond to the PTE token 220(0), the MMU 202 raises an exception, as shown in block 414.

Figure 5:
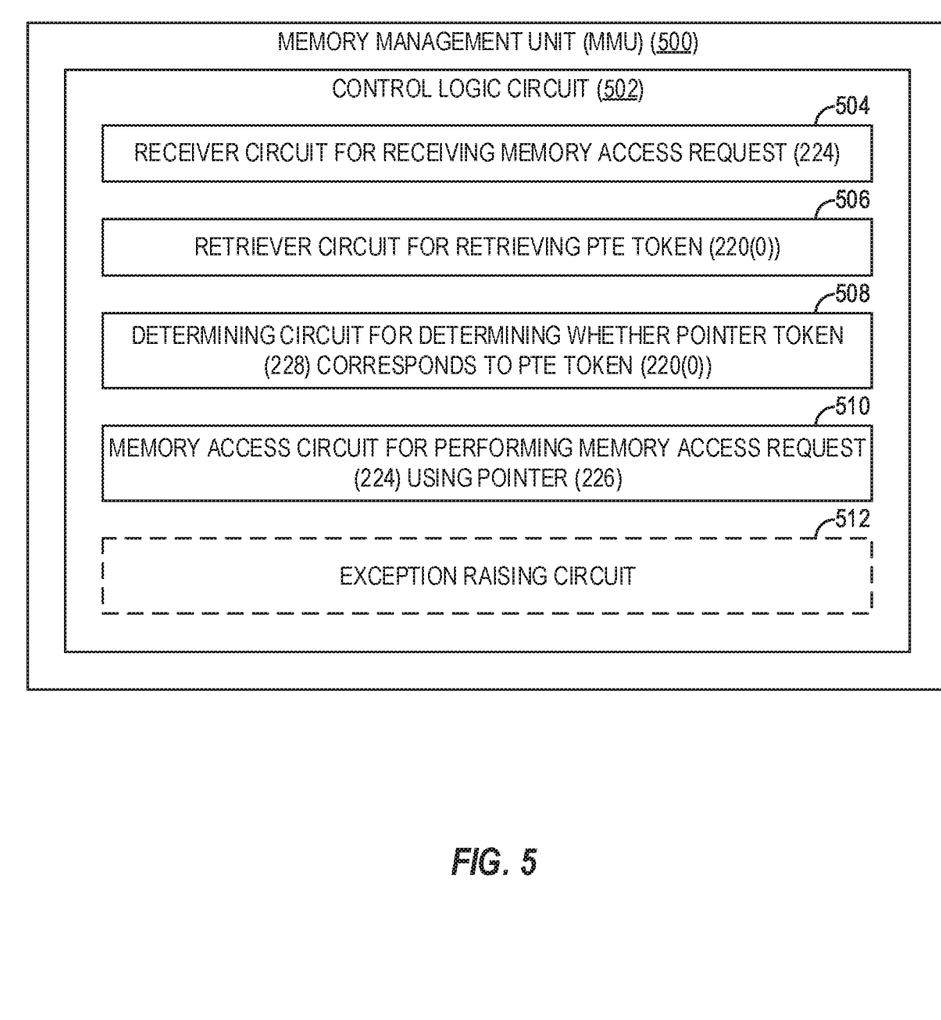
FIG. 5 is a block diagram illustrating exemplary structures of an MMU according to some aspects for providing MMU-assisted address sanitizing.

FIG. 5 is a block diagram illustrating exemplary structures of an MMU 500 according to some aspects for providing MMU-assisted address sanitizing. As seen in FIG. 5, the MMU 500 comprises a control logic circuit 502 that embodies functionality for performing memory management tasks, including virtual-to-physical address translation as well as MMU-assisted address sanitizing. With respect to the address sanitizing functionality of the MMU 500, the control logic circuit 502 comprises a receiver circuit 504 for receiving memory access requests, such as the memory access request 224 of FIG. 2. The control logic circuit 502 further comprises a retriever circuit 506 for retrieving PTE tokens, such as the PTE token 220(0) of FIG. 2. The control logic circuit 502 also comprises a determining circuit 508 for determining whether a pointer token, such as the pointer token 228, corresponds to the PTE token 220(0). The control logic circuit 502 additionally comprises a memory access circuit 510 for performing the memory access request 224 using a pointer such as the pointer 226 of FIG. 2. Finally, in some aspects, the control logic circuit 502 may comprise an exception raising circuit 512..

Figure 6A:
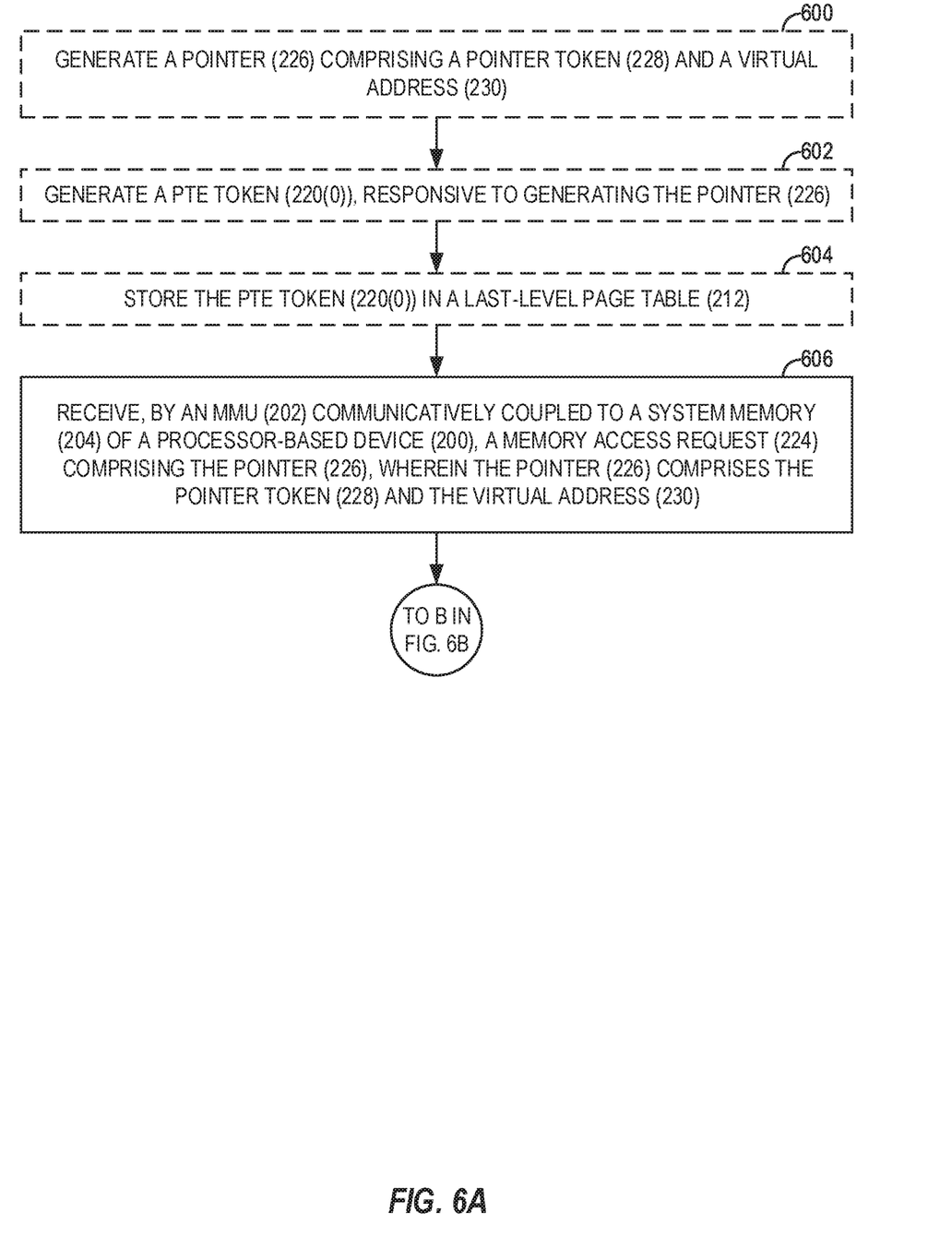
FIGS. 6A and 6B are flowcharts illustrating exemplary operations of an MMU according to some aspects for providing MMU-assisted address sanitizing.
Figure 6B:
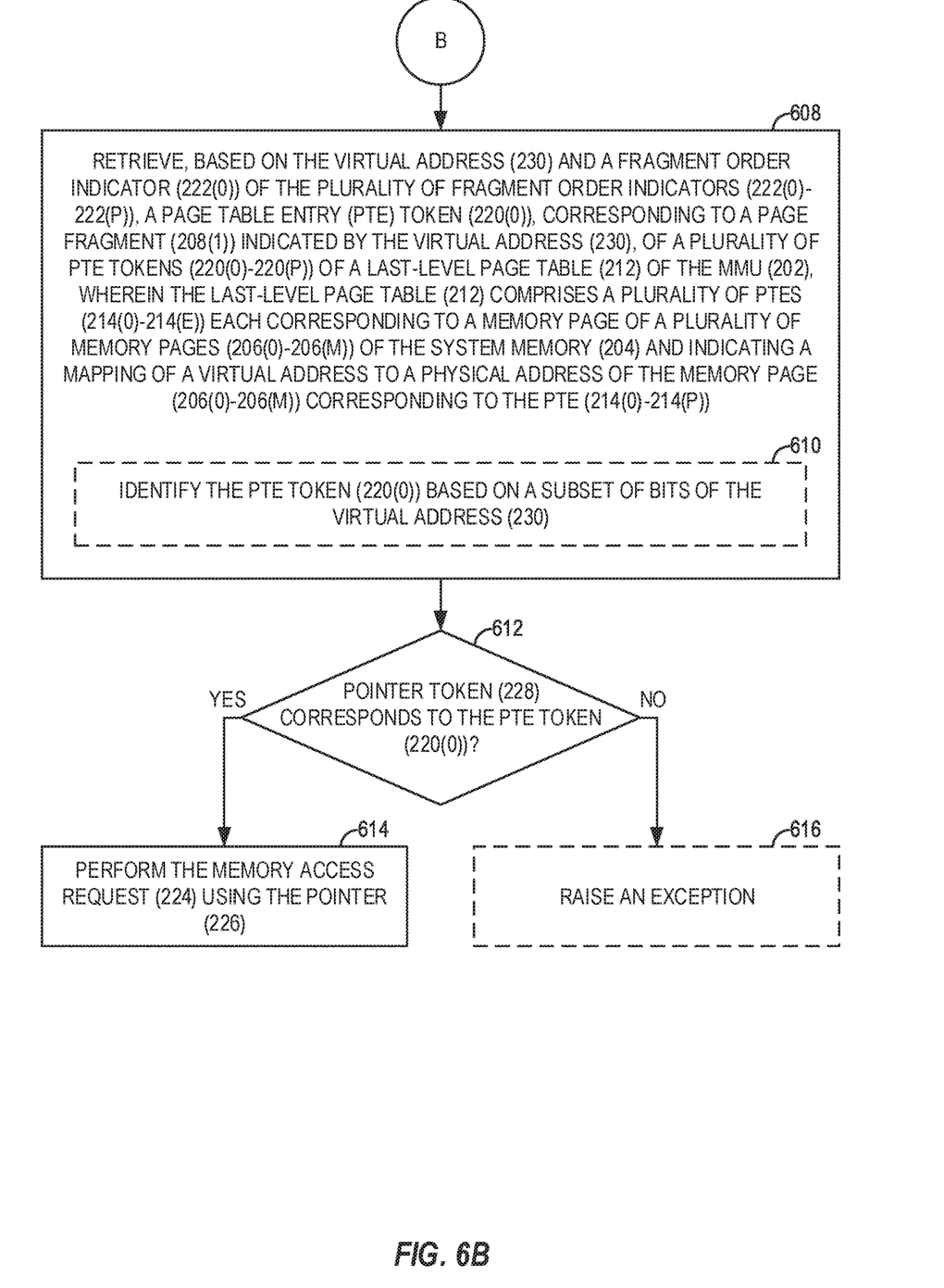

To illustrate exemplary operations of an MMU, such as the MMU 202 of FIG. 2, for providing MMU-assisted address sanitizing, FIGS. 6A and 6B are provided. Elements of FIG. 2 are referenced in describing FIGS. 6A and 6B for the sake of clarity, although it is to be understood that the exemplary operations illustrated in FIGS. 6A and 6B may also apply to corresponding elements of FIG. 3. Operations in FIG. 6A begin in some aspects with the pointer generation module 236 generating the pointer 226 comprising the pointer token 228 and the virtual address 230 (block 600). The pointer generation module 236 in such aspects next generates the PTE token 220(0), responsive to generating the pointer 226 (block 602). The pointer generation module 236 may then store the PTE token 220(0) in the last-level page table 212 (block 604).

The MMU 202, communicatively coupled to the system memory 204 of the processor-based device 200, subsequently receives the memory access request 224. comprising the pointer 226, wherein the pointer 226 comprises the pointer token 228 and the virtual address 230 (block 606). In this regard, the receiver circuit 504 of FIG. 5 may be referred to herein as "a means for receiving a memory access request comprising a pointer, wherein the pointer comprises a pointer token and a virtual address." Processing then resumes at block 608 of FIG. 6B.

Referring now to FIG. 6B, the MMU 202 retrieves, based on the virtual address 230 and the fragment order indicator 222(0) of the plurality of fragment order indicators 222(0)-222(P), the PTE token 220(0), corresponding to the page fragment 208(1) indicated by the virtual address 230, of the plurality of PTE tokens 220(0)-220(P) of the last-level page table 212 of the MMU 202, wherein the last-level page table 212 comprises the plurality of PTEs 214(0)-214(E) each corresponding to a memory page of the plurality of memory pages 206(0)-206(M) of the system memory 204 and indicating a mapping of a virtual address to a physical address of the memory page 206(0)-206(M) corresponding to the PTE 214(0)-214(P) (block 608). Accordingly, the retriever circuit 506 of FIG. 5 may be referred to herein as "a means for retrieving, based on the virtual address and a fragment order indicator of a plurality of fragment order indicators, a PTE token, corresponding to a page fragment indicated by the virtual address, of a plurality of PTE tokens of a last-level page table, wherein the last-level page table comprises a plurality of PTEs, each PTE corresponding to a memory page of a plurality of memory pages of a system memory and indicating a mapping of a virtual address to a physical address of the memory page corresponding to the PTE." In some aspects, the operations of block 608 for retrieving the PTE token 220(0) may include retrieving the PTE token 220(0) based on a subset of bits of the virtual address 230 (block 610). The retriever circuit 506 of FIG. 5 thus may be referred to herein as "a means for retrieving the PTE token based on a subset of bits of the virtual address."

The MMU 202 then determines whether the pointer token 228 corresponds to the PTE token 220(0) (block 612). In this regard, the determining circuit 508 of FIG. 5 may be referred to herein as "a means for determining whether the pointer token corresponds to the PTE token." If so, the MMU 202 performs the memory access request 224 using the pointer 226 (block 614). Accordingly, the memory access circuit 510 of FIG. 5 may be referred to herein as "a means for performing the memory access request using the pointer, responsive to determining that the pointer token corresponds to the PTE token." However, in some aspects, if the MMU 202 determines at decision block 612 that the pointer token 228 does not correspond to the PTE token 220(0), the MMU 202 raises an exception (block 616). The exception raising circuit 512 of FIG. 5 thus may be referred to herein as "a means for raising an exception, responsive to determining that the pointer token does not correspond to the PTE token."

Providing MMU-assisted address sanitizing in processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
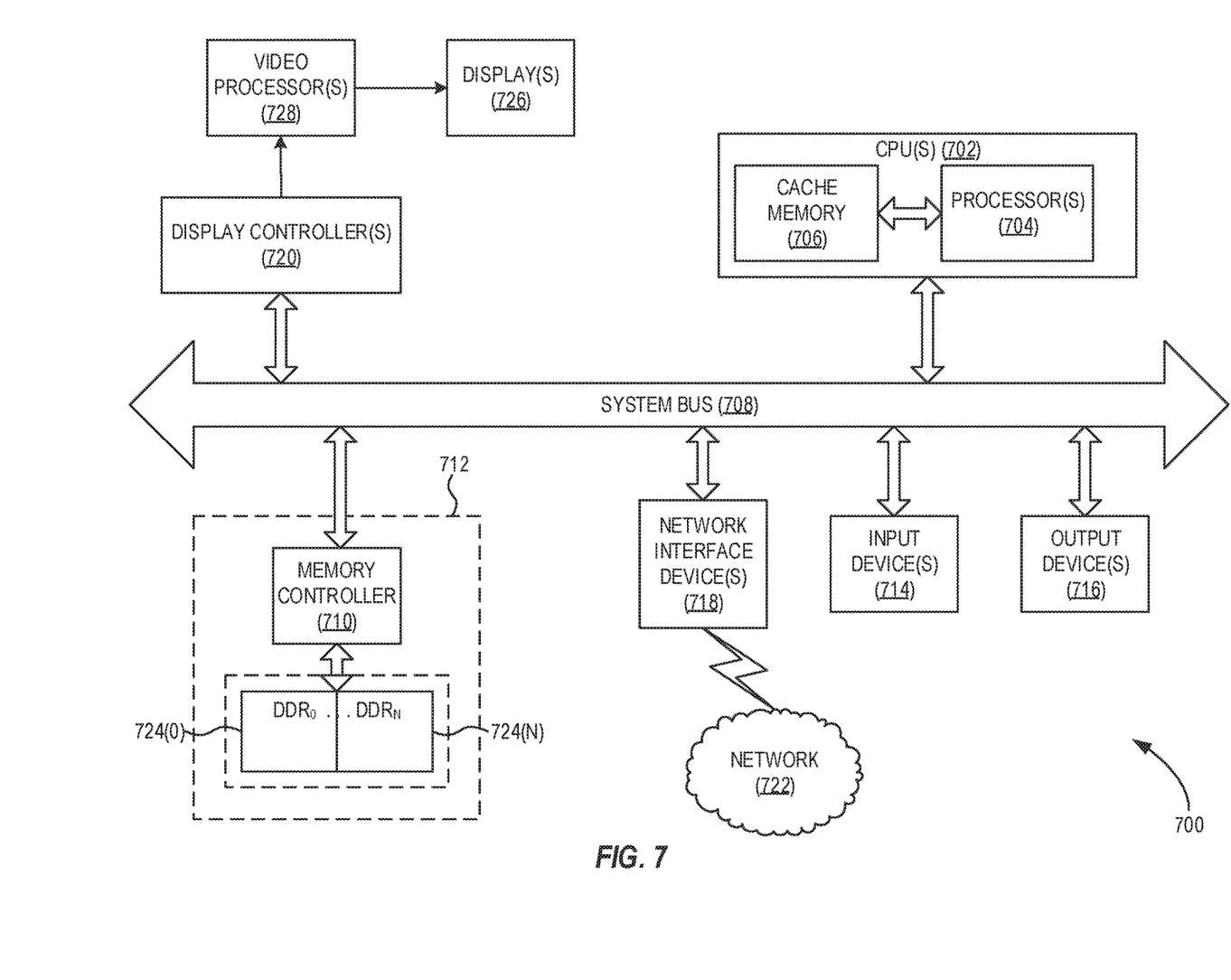
FIG. 7 is a block diagram of an exemplary processor-based system that can include the processor-based devices of FIGS. 2 and 3.

In this regard, FIG. 7 illustrates an example of a processor-based device 700 that may correspond to the processor-based device 200 of FIG. 2. The processor-based device 700 includes one or more central processing units (CPUs) 702, each including one or more processors 704. The CPU(s) 702 may have cache memory 706 coupled to the processor(s) 704 for rapid access to temporarily stored data, The CPU(s) 702 is coupled to a system bus 708 and can intercouple master and slave devices included in the processor-based device 700. As is well known, the CPU(s) 702 communicates with these other devices by exchanging address, control, and data information over the system bus 708. For example, the CPU(s) 702 can communicate bus transaction requests to a memory controller 710 as an example of a slave device.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include one or more memory units 724(0)-724(N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726, The display(s) 726 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific integrated Circuit (ASIC), a Field Programmable Gate Array (FPGA) or other programmable logic device, discrete gate or transistor logic, discrete hardware components, or any combination thereof designed to perform the functions described herein, A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art, An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based device, comprising:
a system memory comprising a plurality of memory pages; and
a memory management unit (MMU) communicatively coupled to the system memory, and comprising a last-level page table;
the last-level page table comprising a plurality of page table entries (PTEs), each PTE corresponding to a memory page of the plurality of memory pages of the system memory and indicating a mapping of a virtual address to a physical address of the memory page corresponding to the PTE;
the last-level page table configured to store:
a plurality of PTE tokens, each corresponding to a page fragment of one or more page fragments of each memory page of the plurality of memory pages of the system memory; and
a plurality of fragment order indicators, each corresponding to a memory page of the plurality of memory pages of the system memory and indicating a page fragment count of the memory page; and
the MMU configured to:
receive a memory access request comprising a pointer, wherein the pointer comprises a pointer token and a virtual address;
retrieve, based on the virtual address and a fragment order indicator of the plurality of fragment order indicators, a PTE token of the plurality of PTE tokens of the last-level page table corresponding to a page fragment indicated by the virtual address;
determine whether the pointer token corresponds to the PTE token; and
responsive to determining that the pointer token corresponds to the PTE token, perform the memory access request using the pointer.

2. The processor-based device of claim 1, wherein the MMU is further configured to, responsive to determining that the pointer token does not correspond to the PTE token, raise an exception.

3. The processor-based device of claim 1, wherein each PTE of the plurality of PTEs of the last-level page table comprises:
a PTE token corresponding to one or more page fragments of the memory page corresponding to the PTE; and
a fragment order indicator corresponding to the memory page corresponding to the PTE.

4. The processor-based device of claim 3, wherein the PTE token of each PTE of the plurality of PTEs of the last-level page table resides in a top byte of the PTE.

5. The processor-based device of claim 1, wherein:
each PTE of the plurality of PTEs of the last-level page table comprises a fragment order indicator corresponding to the memory page corresponding to the PTE; and
the last-level page table further comprises a plurality of shadow PTEs comprising the plurality of PTE tokens.

6. The processor-based device of claim 1, wherein the processor-based device further comprises a pointer generation module configured to:
generate the pointer comprising the pointer token and the virtual address; and
responsive to generating the pointer:
generate the PTE token; and
store the PTE token in the last-level page table.

7. The processor-based device of claim 1, wherein the MMU is configured to retrieve the PTE token based on a subset of bits of the virtual address.

8. The processor-based device of claim 1 integrated into an integrated circuit (IC).

9. The processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor-based device, comprising:
a means for receiving a memory access request comprising a pointer, wherein the pointer comprises a pointer token and a virtual address;

a means for retrieving, based on the virtual address and a fragment order indicator of a plurality of fragment order indicators, a page table entry (PTE) token, corresponding to a page fragment indicated by the virtual address, of a plurality of PTE tokens of a last-level page table, wherein the last-level page table comprises a plurality of PTEs, each PTE corresponding to a memory page of a plurality of memory pages of a system memory and indicating a mapping of a virtual address to a physical address of the memory page corresponding to the PTE;

a means for determining whether the pointer token corresponds to the PTE token; and a means for performing the memory access request using the pointer, responsive to determining that the pointer token corresponds to the PTE token.

11. The processor-based device of claim 10, further comprising a means for raising an exception, responsive to determining that the pointer token does not correspond to the PTE token.

12. The processor-based device of claim 10, wherein each PTE of the plurality of PTEs of the last-level page table comprises:
   a PTE token corresponding to one or more page fragments of the memory page corresponding to the PTE; and
   a fragment order indicator corresponding to the memory page corresponding to the PTE.

13. The processor-based device of claim 12, wherein the PTE token of each PTE of the plurality of PTEs of the last-level page table resides in a top byte of the PTE.

14. The processor-based device of claim 10, wherein:
   each PTE of the plurality of PTEs of the last-level page table comprises a fragment order indicator corresponding to the memory page corresponding to the PTE; and
   the last-level page table further comprises a plurality of shadow PTEs comprising the plurality of PTE tokens.

15. The processor-based device of claim 10, wherein the means for retrieving the PTE token comprises a means for retrieving the PTE token based on a subset of bits of the virtual address.

16. A method for providing memory management unit (MMU)-assisted address sanitizing, comprising:
   receiving, by an MMU communicatively coupled to a system memory of a processor-based device, a memory access request comprising a pointer, wherein the pointer comprises a pointer token and a virtual address;
   retrieving, based on the virtual address and a fragment order indicator of a plurality of fragment order indicators, a page table entry (PTE) token, corresponding to a page fragment indicated by the virtual address, of a plurality of PTE tokens of a last-level page table of the MMU, wherein the last-level page table comprises a plurality of PTEs, each PTE corresponding to a memory page of a plurality of memory pages of the system memory and indicating a mapping of a virtual address to a physical address of the memory page corresponding to the PTE;
   determining whether the pointer token corresponds to the PTE token; and
   responsive to determining that the pointer token corresponds to the PTE token, performing the memory access request using the pointer.

17. The method of claim 16, further comprising, responsive to determining that the pointer token does not correspond to the PTE token, raising an exception.

18. The method of claim 16, wherein each PTE of the plurality of PTEs of the last-level page table comprises:
   a PTE token corresponding to one or more page fragments of the memory page corresponding to the PTE; and
   a fragment order indicator corresponding to the memory page corresponding to the PTE.

19. The method of claim 18, wherein the PTE token of each PTE of the plurality of PTEs of the last-level page table resides in a top byte of the PTE.

20. The method of claim 16, wherein:
   each PTE of the plurality of PTEs of the last-level page table comprises a fragment order indicator corresponding to the memory page corresponding to the PTE; and
   the last-level page table further comprises a plurality of shadow PTEs comprising the plurality of PTE tokens.

21. The method of claim 16, further comprising:
   generating the pointer comprising the pointer token and the virtual address; and
   responsive to generating the pointer:
      generating the PTE token; and
      storing the PTE token in the last-level page table.

22. The method of claim 16, wherein retrieving the PTE token is based on a subset of bits of the virtual address.

* * * * *